US008422395B2

(12) United States Patent
Greenberg et al.

(10) Patent No.: US 8,422,395 B2
(45) Date of Patent: Apr. 16, 2013

(54) RESILIENT 1:N FIRST-HOP GATEWAY SELECTION MECHANISM

(75) Inventors: Albert Greenberg, Seattle, WA (US); David A. Maltz, Bellevue, WA (US); Parantap Lahiri, Redmond, WA (US); Parveen K. Patel, Redmond, WA (US); Sudipta Sengupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 12/242,775

(22) Filed: Sep. 30, 2008

(65) Prior Publication Data

US 2010/0080144 A1 Apr. 1, 2010

(51) Int. Cl.
*H04L 12/26* (2006.01)
*G01R 31/08* (2006.01)

(52) U.S. Cl.
USPC .......................................... 370/253; 370/236

(58) Field of Classification Search .................. 370/253, 370/236
See application file for complete search history.

(56) References Cited

U.S. PATENT DOCUMENTS

| | | | | |
|---|---|---|---|---|
| 2003/0179742 A1* | 9/2003 | Ogier et al. | .................... | 370/351 |
| 2005/0171937 A1* | 8/2005 | Hughes et al. | .................... | 707/3 |
| 2006/0123012 A1* | 6/2006 | Barth | .............................. | 707/10 |
| 2008/0101396 A1* | 5/2008 | Miyata | ........................... | 370/408 |
| 2008/0184031 A1* | 7/2008 | McGough | ..................... | 713/171 |
| 2008/0219237 A1* | 9/2008 | Thubert et al. | ................. | 370/349 |
| 2009/0092051 A1* | 4/2009 | Miyata | ........................... | 370/236 |
| 2009/0316754 A1* | 12/2009 | Leiby et al. | .................... | 375/132 |
| 2010/0172270 A1* | 7/2010 | Smith et al. | .................... | 370/255 |

OTHER PUBLICATIONS

Cisco IOS Software—Configuring IRDP, Cisco Systems, Inc. Feb. 10, 2008, 8 pages, http://www.cisco.com/en/US/docs/ios/ipapp/configuration/guide/ipapp_irdp.html.
GLBP—Gateway Load Balancing Protocol, Cisco Systems, Inc. retrieved on Nov. 13, 2008, 34 pages, http://www.cisco.com/en/US/docs/ios/12_2t/12_2t15/feature/guide/ft_glbp.html.
ICMP Router Discovery Messages. Deering, Xerox PARC, Sep. 1991, 19 pages, http://tools.ietf.org/html/rfc1256.
Internet Router Discovery Protocol (IRDP) Client Support Added to Windows NT 4.0, Microsoft, Nov. 1, 2006, 3 pages, http://support.microsoft.com/kb/223756.
Schluting, "Understanding OSPF Routing", retrieved on May 29, 2011 at <<http://www.webopedia.com/DidYouKnow/Computer_Science/2006/OSPF_Routing.asp>>, 3 pages.

* cited by examiner

*Primary Examiner* — Mark Rinehart
*Assistant Examiner* — Angel Brockman
(74) *Attorney, Agent, or Firm* — Lee & Hayes, PLLC

(57) ABSTRACT

Exemplary methods, systems, and computer program products describe selecting a gateway based on health and performance information of a plurality of gateways. The techniques describe gateways advertising health and performance information, computing devices creating a table of this health and performance information, and selecting a gateway using the table. In response to changes in the health and performance information, the computing device may select a different gateway. The process allows network traffic load to be distributed across a plurality of gateways. This process further provides resilience by allowing a plurality of active gateways to substitute for a non-functioning gateway.

19 Claims, 7 Drawing Sheets

| ADDRESS | STATUS | TIME TO ACTIVE (MINUTES) | TIME TO STANDBY (MINUTES) | UNUSED BANDWIDTH (PERCENTAGE) | UNUSED BANDWIDTH (GIGABYTES) | RELIABILITY INDICATOR |
|---|---|---|---|---|---|---|
| 08:00:69:A | ACTIVE | -- | -- | 25 | 2.50 | 10 |
| 08:00:69:B | ACTIVE | -- | 120 | 50 | 2.00 | 10 |
| 08:00:69:C | ACTIVE | -- | -- | 90 | 3.60 | 4 |
| ••• | ••• | ••• | ••• | ••• | ••• | ••• |
| 08:00:69:N | STANDBY | 60 | -- | 99 | 3.99 | 8 |

RESILIENT 1:N FIRST-HOP GATEWAY SELECTION MECHANISM

TECHNICAL FIELD

The subject matter relates generally to network systems, and more specifically, to selecting a network gateway.

BACKGROUND

Computer networks may be separated into domains that contain groupings of computing devices, such as personal computers, servers, routers, switches, and/or firewalls, administered as a unit with common rules and procedures. The Internet is one type of a computer network. In order to access the full range of information and functionality available on the computer network, computing devices may send messages to computing devices in other domains.

Communication between computing devices in different domains typically travels through a network gateway. The network gateway is one type of computing device that may serve as a connection, or portal, between domains. The first network gateway a message passes through is called a first-hop gateway. Reliability and capacity of network gateways, in particular first-hop gateways, can affect communication, or traffic, on the computer network. Network gateways, like other computing devices, occasionally fail. Network gateways can also become bottlenecks for traffic traveling from one domain to another.

Traditional computer networks address a problem of network gateway failure by arranging network gateways in redundant pairs. A first network gateway is the primary route for network traffic and a second network gateway is a backup. If the primary network gateway fails, all network traffic that was going through the primary network gateway is rerouted through the backup network gateway. This arrangement of one primary network gateway to one backup network gateway creates 1:1 resilience. Typically, in the primary/backup network gateway arrangement, backup network gateways remain idle until the primary network gateway fails. Thus, the capacity of a backup network gateway is not available to reduce bottlenecks, and approximately half of all network gateways in a network (i.e. the backup network gateways) are idle at any time.

Another problem in traditional computer networks is that each computing devices in a domain sends a stream of messages to an associated primary network gateway to keep the association with the network gateway alive and to monitor the health of the network gateway. These messages themselves create network traffic that can slow other communications. In a large domain, these messages may consume a significant portion of the total capacity of a network gateway. Conventional routing protocols such as Routing Information Protocol (RIP), Open Shortest Path First (OSPF), and Hot Standby Routing Protocol (HSRP), make use of the primary/backup network gateway arrangement to select a first-hop gateway. Thus, the existing routing protocols all share the above deficiencies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Neither is the claimed subject matter limited to implementations that remedy deficiencies discussed in the Background.

In view of the above, this disclosure describes various exemplary systems, methods, and computer program products for selecting a network gateway. Each network gateway publishes health and performance information that is used to select a path for routing messages. This published information is available to computing devices in communication with the network gateway. Each computing device may select the network gateway to use based on a comparison of heath and performance information from several network gateways. When a status of the network gateway changes, a computing device may route subsequent messages to a different network gateway. As a network gateway approaches maximum capacity, a computing device may cease routing messages to that network gateway. If the network gateway is in a standby mode, such as during maintenance, or will soon enter standby mode, a computing device may route messages to another network gateway.

The ability to route messages to one of many network gateways allows for distributing the total message load across several network gateways. Furthermore, publishing health and performance information from the network gateways distributes information throughout the computing devices of a domain with a minimum of network traffic.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

FIG. 4 is a table representing information contained in an exemplary hash table.

DETAILED DESCRIPTION

Overview

Figure 1:
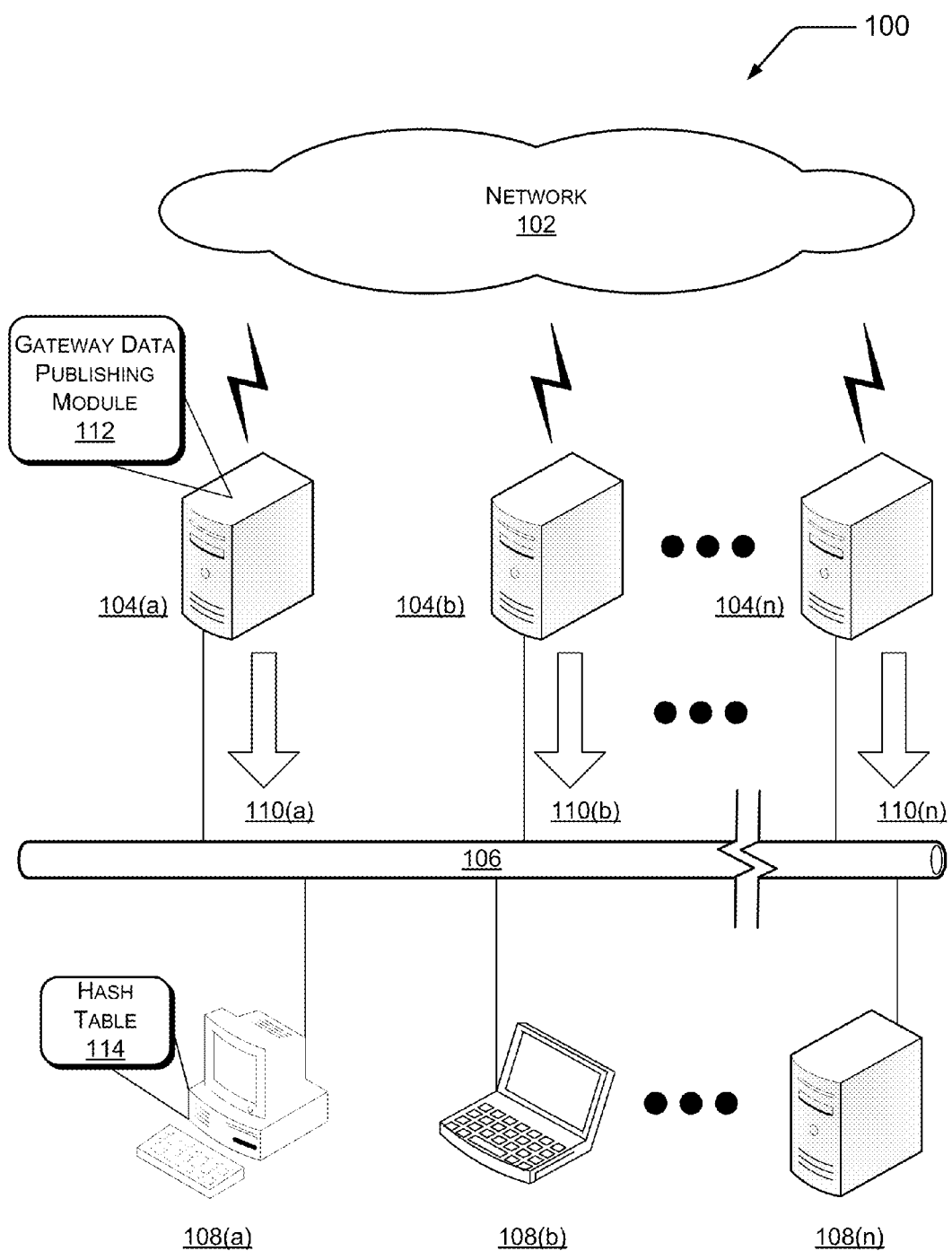
FIG. 1 is a network diagram of an exemplary domain containing multiple network gateways.

This disclosure is directed to selecting a first-hop network gateway for routing message traffic through a computer network. This disclosure describes health and performance information distributed by gateways and routing decisions made based on this information. An awareness of gateway health and performance allows a load balancing across multiple gateways as well as network resilience if a gateway fails.

Computer networks, or simply networks, may be described as a series of layers stacked on top of each other, each layer in a stack performing a specific function in a process of communication over a network. Each layer may define a data communication function that can be performed by any number of protocols. One suite of protocols used on networks, including the Internet, is a Transmission Control Protocol/Internet Protocol (TCP/IP). TCP/IP may be described using three functional layers; however, descriptions using different numbers of layers are possible.

Layer 1 is a physical layer that includes wiring, optical fibers, and other hardware used to enable two computing devices on the network to communicate. Layer 2, or a data-link layer, includes protocols that define how to transmit data across connections in the physical layer, exchange data between a computing device and the physical layer, and deliver data to another computing device in a same domain. One example of a layer 2 protocol is an Ethernet protocol. Layer 3, or a network layer, includes functions such as mapping network addresses (e.g. IP addresses) to devices in the physical layer. Layer 3 is also responsible for converting data into a format compatible with layer 2, such as converting data packets into frames of data. One example of a layer 3 protocol is an Internet Protocol (IP).

As mentioned above, messages or data travelling through the network may be packaged into packets that contain both the data and a destination address. A single message (e.g. a single audio file containing a song) is often broken into multiple packets. A technique such as constant hashing, or stable hashing, may be used to add a field to these multiple packets identifying each packet as containing related content. A group of packets identified as containing related content is a "flow." Network performance is generally improved if packets in a flow are sent through a same path to the network. Directing the packets in the flow across different paths through the network may lead to problems, such as the packets containing an end of the song arriving at a destination before the packets contain a beginning of the song.

The network gateway selection mechanism described herein is not limited to any particular network type, network layering scheme, or protocol, but may be applied in many contexts and environments. The subject of this disclosure may function on networks using frames, packets, flows, or any other system for organizing and managing data. By way of example and not limitation, the gateway selection mechanism may be employed in a Local-Area Network (LAN), a Wide-Area Network (WAN), and the like.

Exemplary Environment for Network Gateway Selection

The following discussion of an exemplary operating environment provides the reader with assistance in understanding ways in which various subject matter aspects of the system, methods, and computer program products may be employed. The environment described below constitutes an example and is not intended to limit application of the subject matter to any one particular operating environment.

FIG. 1 illustrates a network diagram of an exemplary domain 100 for routing messages to a network gateway. The domain 100 is connected by uplinks to a network 102 that may be directly or indirectly connected to the Internet. A plurality of network gateways 104(a) . . . 104(n) connect the domain 100 to the network 102. Each of the network gateways 104 is connected to the physical layer 106 of the domain. The physical layer 106 carries messages between hosts 108(a) . . . 108(n) and the network gateways 104. The messages may be sent using an Ethernet protocol or another suitable level 2 protocol. Hosts 108 may include computing devices running an operating system and participating in network activities. Computing devices that are suitable for use as hosts 108, include, but are not limited to, a personal computer, a laptop computer, a desktop computer, a workstation computer, a personal digital assistant, a cellular phone, a writing tablet, and the like. These various types of hosts 108 enable a user to communicate with other hosts 108 in the same domain or, by sending messages through one of the network gateways 104, with computing devices or hosts elsewhere in the network 102.

Each network gateway 104 in FIG. 1 publishes advertisements 110(a) . . . 110(n) of its health and performance to the hosts 108 in the domain 100. The advertisements 110 may be generated by a gateway data publishing module 112 such as shown for gateway 104(a). In some embodiments the advertisements 110 may indicate that the status a network gateway 104 is active and ready to receive more network traffic or inactive and unable to receive network traffic. Additionally, or as an alternative to indicating status, the advertisements 110 may indicate an available capacity, or bandwidth, of the corresponding gateway 104. Each gateway 104 may be aware of the gateway's own maximum bandwidth, currently used bandwidth, and currently unused bandwidth. In some embodiments a network gateway 104 derives bandwidth information by monitoring an uplink to the network 102. In some implementations, the network gateways 104 may publish an advertisement declining additional network traffic if the remaining bandwidth capacity is below a threshold.

The hosts 108 receive the advertisements 110 and may record information contained in the advertisements in a hash table 114 as shown for host 108(a). The hash table 114 may be implemented in hardware or software. The hash table may be indexed to increase access speed. In some embodiments each host may contain the hash table. In other embodiments only one host 108 may contain the hash table 114 (e.g. host 108(a) but not hosts 108(b) . . . 108(n)). In yet further embodiments more than one, but fewer than all hosts may contain the hash table. The scope of this disclosure is not limited to data stored in a hash table but rather the scope encompasses any data structure capable of storing and organizing the data described in this disclosure (e.g. b-tree, radix tree, indexed table, etc.).

In one embodiment the advertisements 110 may be published as multicast messages to subscribing hosts 108. Typically every host 108 in the domain 100 will subscribe to the multicast advertisements 110(a) . . . 110(n) from all the network gateways 104(a) . . . 104(n), but it is also within the scope of this disclosure for a subset of the hosts subscribe to the advertisements. It is also possible for a subset of the network gateways to publish multicast messages. The multicast messages may be sent using protocols of either layer 2, the data-link layer, or layer 3, the network layer.

In another embodiment a distributed directory server receives health and performance information from the network gateways. The distributed directory server may be one of the hosts. The distributed directory server can receive health and performance information from the network gateways by subscribing to multicast messages, receiving information in response to a query sent to the network gateways, and the like. The distributed directory server may store this information in the hash table as described above. In this embodiment, hosts lacking the hash table could refer to a "master" hash table maintained on the distributed directory server to obtain health and performance information on the network gateways.

In yet a further embodiment, hosts having the hash table may exist in the same domain with a distributed directory server and with hosts lacking the hash table. Hosts that lack the hash table are able to consult the distributed directory server while hosts having the hash table may select a network gateway without using the distributed directory server. By way of illustration, a one of the hosts may function as a distributed directory server for other hosts while a different host consults a local hash table. For all of the above embodiments, it is also envisioned within the scope of this disclosure for the hosts to store and/or organize the received advertisements in a format other than the hash table.

Exemplary 1:N Resilience of Network Gateways

Figure 2:
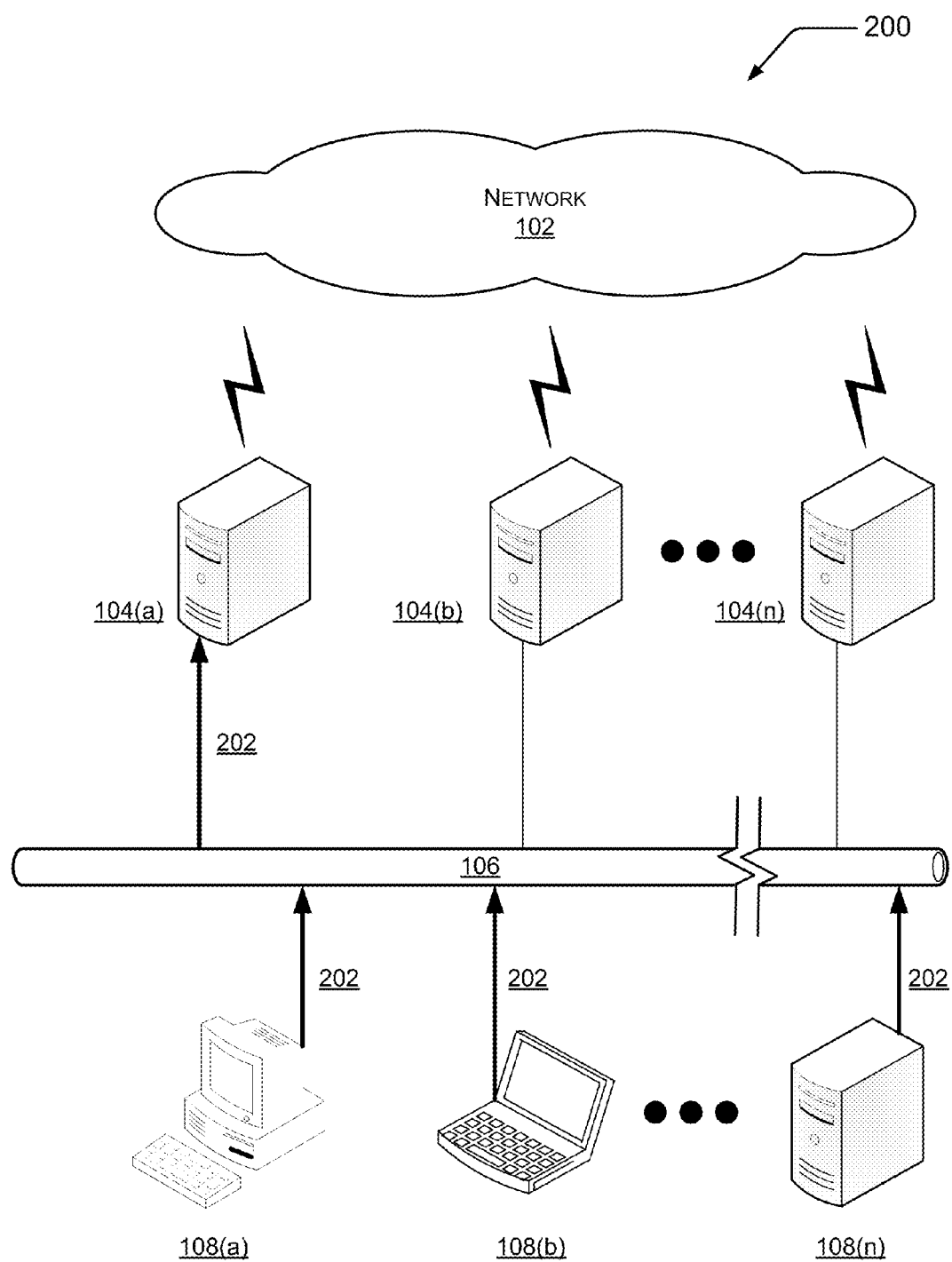
FIG. 2 is a network diagram of an exemplary domain showing routing of data packets.

FIG. 2 illustrates a network diagram of an exemplary domain 200 that is similar to domain 100. Arrows indicate traffic 202 moving from hosts 108(a) . . . 108(n) to the network 102 through network gateway 104(a). As discussed above, this traffic may be data packets or flows of data packets. The hosts 108 select network gateway 104(a) based on health and performance information. Exemplary methods of making this selection will be discussed below. In the embodiment shown in FIG. 2, network gateway 104(a) is carrying outgoing traffic to the network 102 while network gateways 104(b) . . . 104(n) are not carrying outgoing traffic.

Figure 3:
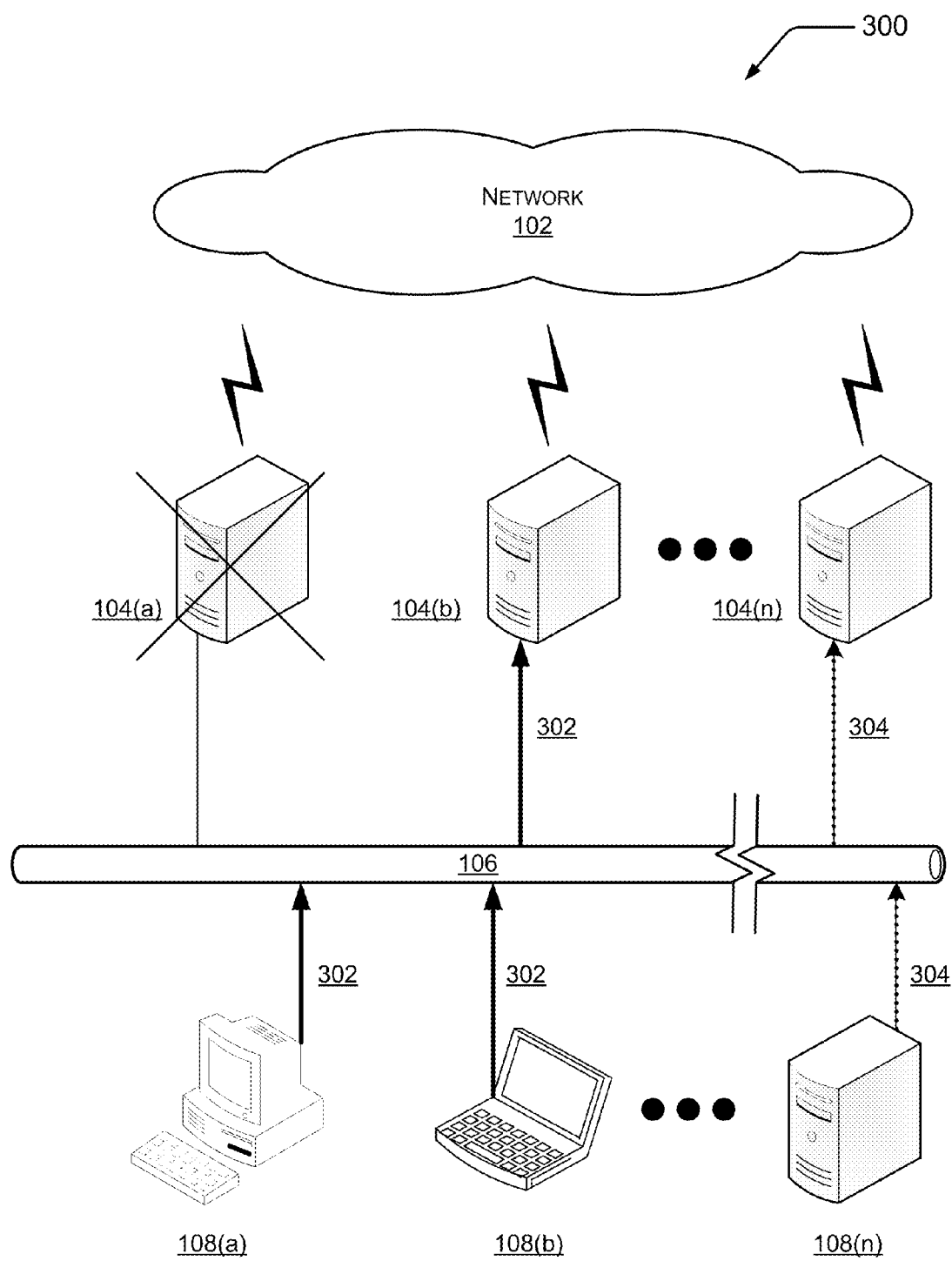
FIG. 3 is a network diagram of an exemplary domain showing routing of data packets after failure of a network gateway.

FIG. 3 illustrates a network diagram of an exemplary domain 300 which is the domain of FIG. 2 following failure of the network gateway 104(a). Network gateways 104 may fail for reasons such as hardware malfunctions, network malfunctions, software malfunctions, bandwidth overload, and the like. When network gateway 104(a) fails other network gateways 104(b) . . . 104(n) may be available to carry the traffic. Other network gateways 104 are not affected by this failure beyond the extent those other network gateways 104 receive more traffic. This ability of "n" network gateways (e.g. network gateways 104(b) . . . 104(n)) to take on traffic formerly carried by one failed network gateway (e.g. network gateway 104(a)) creates 1:N resilience. In this example, the traffic 202 shown in FIG. 2 is redistributed as traffic 302 that reaches the network 102 via network gateway 104(b) and traffic 304 that reaches the network 102 via network gateway 104(n). The traffic may be data packets, flows of data packets, or the like. In some embodiments packets in a flow are routed through the same network gateway 104 rather than splitting a flow between multiple network gateways 104. In one implementation, the different flows leaving a host 108 may be routed to different network gateways 104. For example, host 108(b) may send a flow to network gateway 104(b) as shown in FIG. 3 and later route another flow through network gateway 104 (n).

Exemplary Hash Table

FIG. 4 illustrates an exemplary representation of the information contained in the hash table 400. As discussed above, the hash table 400 may be generated from advertisements published by the network gateways 104. The first column represents addresses of network gateways 104 in the domain. For example, address 08:00:69:A may correspond to network gateway 104(a) as shown in FIG. 1-3. The addresses may be unique addresses, real addresses, virtual address, and the like. The addresses may be Media Access Control (MAC) addresses, IP addresses, or any other suitable network addressing scheme. In the hash table 400, each network gateway address is associated with the health of the corresponding network gateway 104. The health information may represent the ability of the network gateway to transfer traffic from the host 108 to the network 102. Health information may alternatively be termed health status, or status. Status may be represented as "Active" or similar nomenclature to indicate an ability to receive and forward traffic to the network 102. Status may also be represented by "Standby" or similar nomenclature to indicate the ability to publish advertisements 110, yet an inability to accept traffic from hosts 108. The advertisement 110 indicating Active status will switch the representation of the network gateway 104 in the hash table 114 from Standby to Active status and the advertisement 110 indicating Standby status will have an opposite effect. In some embodiments the hash table 400 may also include the status representation as "Down" or similar nomenclature to indicate that the network gateway 104 is not publishing advertisements. The network gateway my change to Down status after failing to send a defined number of expected advertisements 110.

In some embodiments, the hash table 400 may also include additional information qualifying the "Active" or "Standby" status of the network gateway 104. If, for example, the Active network gateway 104 is scheduled to undergo maintenance then published advertisements 110 from the Active network gateway 104 may indicate when the maintenance is scheduled to begin. The hash table 400 may then reflect this by indicating that Active status will change to Standby status at that time. In FIG. 3 one example of this is shown by network gateway at address 08:00:69:B associated with a Time to Standby of 120 minutes.

FIG. 4 shows network gateways that are on Standby status, such as network gateway at address 08:00:69:N. The network gateway may provide further information about the Standby status by indicating a time until a return to Active status. The hash table 400 shows that the network gateway at address 08:00:69:N will return to Active status in 60 minutes. Time to Active status may be known if, for example, scheduled maintenance has a scheduled end time. It is possible for network gateways in Standby status to update the Time to Active because the network gateways in Standby status are still publishing advertisements. Both the Time to Standby and Time to Active may be represented as discussed above by a "countdown time" or as any other representation of time such as an absolute time based on a network clock.

The hash table 400 may also include performance data on the network gateways. This performance data may include available capacity, or bandwidth, data on the network gateways. The bandwidth data included in the hash table 400 may present available bandwidth as a percentage of total bandwidth or as absolute capacity (e.g. gigabytes). In some embodiments, such as shown in FIG. 4, available bandwidth is included in hash table 400 as a percentage and as an absolute capacity. The different methods of presenting available bandwidth may lead to different routing decisions in domains where a plurality of available network gateways includes network gateways with different bandwidth capacities. For example, the network gateway with a 10 gigabyte capacity that is carrying a load of 7.5 gigabytes has an unused bandwidth of 25% and 2.5 gigabytes. A different network gateway with a 4 gigabyte capacity that is carrying a load of 2.0 gigabytes has a higher percentage of unused bandwidth (i.e. 50%) but a lower absolute capacity of unused bandwidth (i.e. 2.0 gigabytes).

In some embodiments the hash table 400 may also include reliability data on the network gateways 104. A reliability indicator is derived from analysis of advertisements 110 published by the network gateway. The reliability indicatory may be a number as shown in FIG. 4, a level such as low-medium-high, or any other metric representing reliability. The analysis to derive a reliability indicator may be performed by the host or the directory service server maintaining the hash table 400.

Exemplary Method for Selecting a Network Gateway

Figure 5:
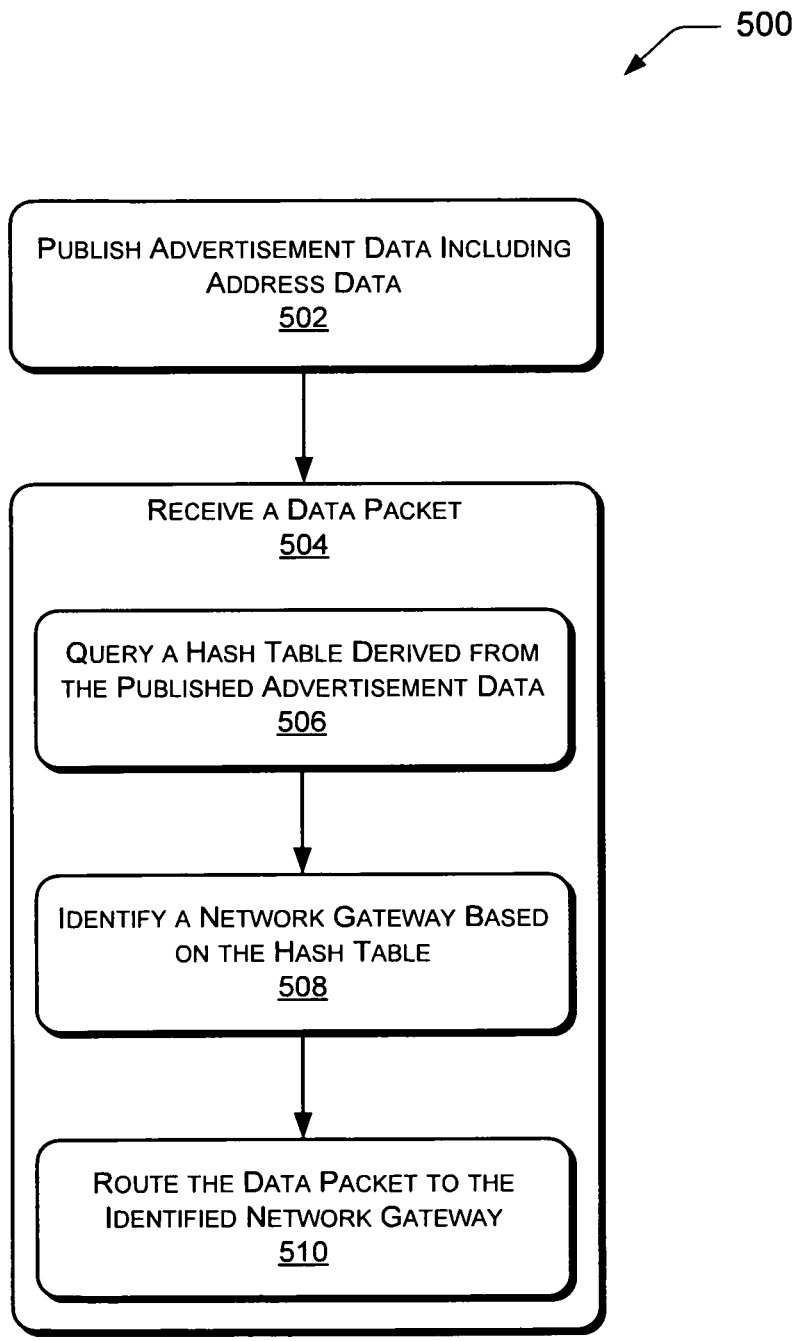
FIG. 5 is a block diagram of an exemplary method for publishing advertisement data.

FIG. 5 illustrates an exemplary method 500 for selecting a network gateway by using a hash table, such as the hash table shown in FIG. 4. In one embodiment the network gateway is selected by a host as a network gateway for routing data packets to the network. Block 502 represents publication of advertisement data including address data, such as the advertisement data 110 shown in FIG. 1. Block 504 represents receipt of the data packet. As discussed above, the data packet may be part of a flow of data packets.

Block 506 represents the querying of the hash table derived from the published advertisement data. As discussed above, the hash table may contain health and performance data correlated to addresses of network gateways. In some embodiments the hash table is a dynamic list that changes when additional advertisement data is published. The hash table may present a representation of the network gateways in the domain. As a result, by querying the hash table it is possible to identify health and performance characteristics of multiple network gateways. In one embodiment the querying is performed by the host containing the hash table, such as host 108(*a*) and hash table 114 of FIG. 1. In another embodiment the host queries the hash table of the distributed directory server.

Block 508 represents the identification of the network gateway based on the information in the hash table. The network gateway may be identified based on any one factor or a combination of multiple factors. In some embodiments the network gateway is identified randomly from the hash table. In other embodiments the network gateway may be identified based on load balancing considerations. The load balancing may be performed, for example, in a round robin fashion or by other known load balancing techniques. The load balancing may be based on the health and the performance of the network gateways. The network gateway identified from the hash table may be any network gateway advertising an Active status or any network gateway advertising an Active status excluding those network gateways that will shortly change to Standby status. Network gateways indicating, for example, less than 15 seconds before changing to Standby status may be excluded. Another factor for identifying a network gateway may be the amount of unused bandwidth either as percentage of unused bandwidth, absolute amount of unused bandwidth, or some combination of percentage and absolute amount of unused bandwidth. For example, only network gateways with more than a defined percentage of unused bandwidth (e.g. 10%) may be identified. Yet another factor for identifying a network gateway may be the reliability indicator.

As discussed above, it may be desirable to keep the data packets of the flow together. In some embodiments the data packets in the flow will be routed to the same network gateway. Accordingly, when the flow is managed as a single transaction the network gateway is selected in order to route the data packets of a flow through the same network gateway. For example, even if a network gateway does not have a largest amount of unused bandwidth, data packets may be routed through that same network gateway to keep all data packets in the flow together.

Box 510 represents routing a data packet to the identified network gateway. Once the network gateway is identified as described in box 508 the host uses the address information from the hash table to direct the data packet to the identified network gateway. This is the network gateway that receives the data packet in box 504. Method 500 is described in terms of data packets, but the scope of this disclosure is not limited to any data type or organization scheme.

Exemplary Method for Building and Updating the Hash Table

Figure 6:
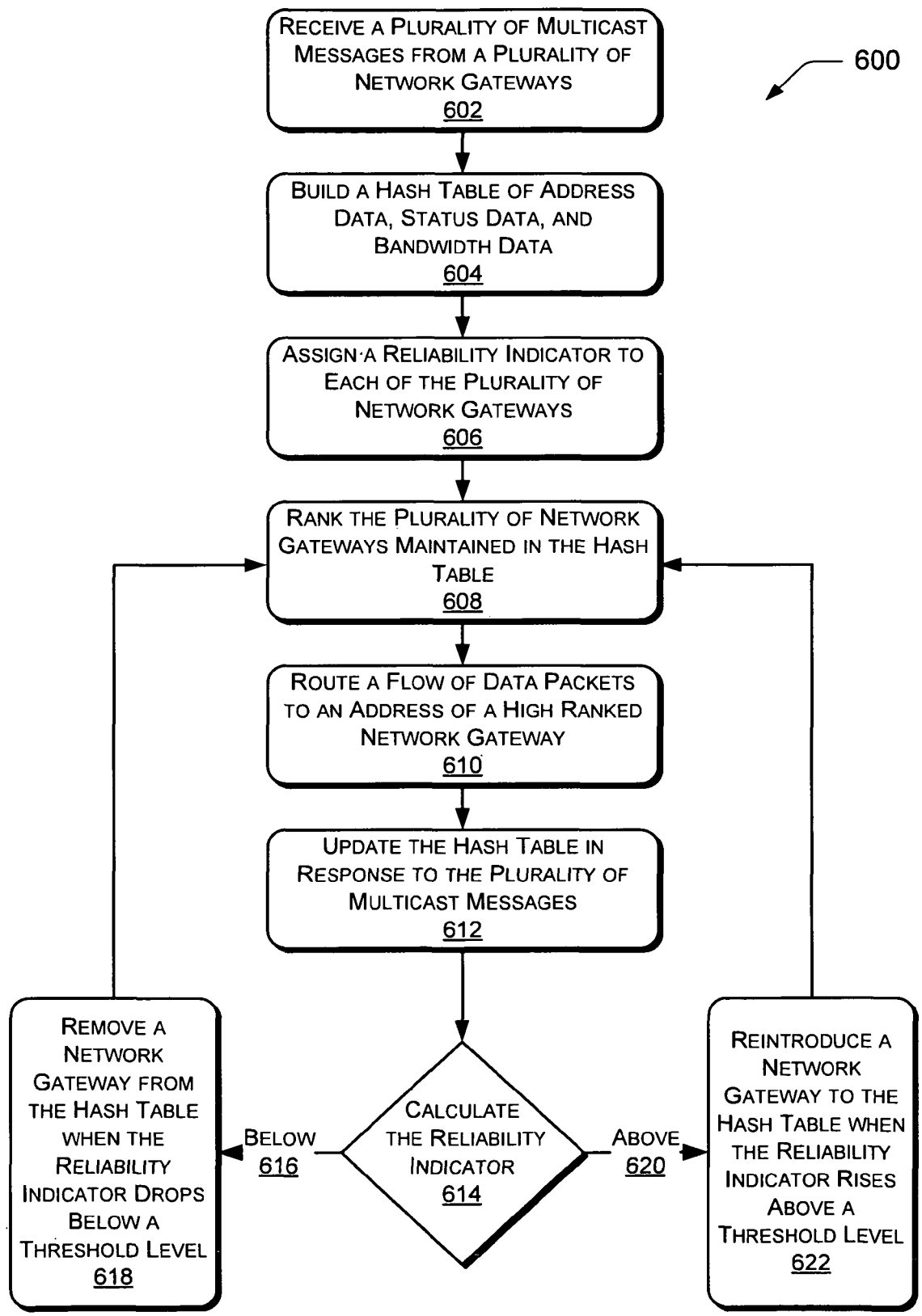
FIG. 6 is a block diagram of an exemplary method for building and updating a hash table.

For ease of understanding, the method 600 is delineated as separate steps represented as independent blocks in FIG. 6. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps may be omitted.

FIG. 6 illustrates an exemplary method 600 for building and updating the hash table. Block 602 represents receiving a plurality of multicast messages from the plurality of network gateways. The multicast messages may be one implementation of published advertisements. Multicasting allows a large number of network gateways to send messages without creating excess network traffic. In one embodiment the multicast messages are published using the layer 2 protocol such as the Ethernet. In another embodiment the multicast messages are published using the layer 3 protocol such as IP. The multicast messages may be received at the host, the distributed directory server, or the like.

In some embodiments the multicast messages are encrypted. The encryption includes, but is not limited to, maintaining a private key on the network gateway 104 for encrypting the multicast messages and maintaining a public key on the hosts for decrypting the multicast messages. With this configuration, the hosts are unable to masquerade as the network gateways because only the network gateways maintain the private key.

Block 604 represents building the hash table of address data, status data, and bandwidth data. As discussed above, address data, status data, and bandwidth data may be one implementation of health and performance information. The hash table may be built in the host, the distributed directory server, or the like. When a new host or distributed directory server is initially connected to the network that new host or distributed directory server may be naive of the status of the network gateways. As multicast messages are received the information contained in those messages is added to the hash table. In the absence of a usable hash table the host or distributed directory server may send data packets to a default address. The hash table may be unusable if the hash table does not exist, is corrupted, does not contain any addresses, or for similar reasons. If network gateways listed in the hash table go down then the host may revert to sending data packets to the default address. In one implementation this default address is the IP address of a network gateway.

Block 606 represents assigning a reliability indicator to each one the plurality of network gateways. The reliability indicator represents the probability that the network gateway will successfully deliver the data packet to the network. The reliability may be indicated by a number (e.g. from 1 to 10), by a level (e.g. low, medium, high), by a binary condition (e.g. reliable or unreliable), or the like. The reliability may be determined from analyzing past performance of the network gateway. In some implementations the multicast messages are published on a predictable schedule such as, for example, every 30 seconds. If a gateway fails to publish the multicast message, hosts and/or distributed directory servers expecting that message will note the absence of the message. After a certain number of "missing" messages the hosts and/or distributed directory server may lower the reliability indicator of the network gateway. By way of example and not limitation, this lowering may comprise changing the reliability indicator from reliable to unreliable if three consecutive messages are missed, lowering the reliability indicator from high to medium if three messages out of the last 100 messages are missed, lowering the reliability indicator from 10 to 9 when one message is missed, and the like.

The reliability indicator may also be raised to represent an improved reliability. Raising the reliability indicator will generally be implemented in an opposite but analogous method to lowering the reliability indicator. In some embodiments there may be a dampening such that the reliability indicator is raised slower than it is lowered. Past reliability problems may lead to more stringent requirements for raising the reliability indicator. By way of example and not limitation, for a network gateway that failed to send 10 out of the last 100 expected messages the host and/or distributed directory server may raise the reliability indicator only after receiving 10 consecutive messages without any missing messages.

Block 608 represents ranking the plurality of network gateways maintained in the hash table. The network gateways may be ranked based on the information contained in the hash table or other information. Ranking the network gateways in the hash table may make the hash table into an ordered list. The ranking generally reflects the desirability of a given network gateway as a route for sending data packets to the network. All network gateways represented in the hash table may have the same ranking, every network gateway may have a different ranking such that there is a highest ranked network gateway and a lowest ranked network gateway, or there may be a highest to a lowest ranking that includes ties between network gateways.

The rankings may be based on the health and performance of the network gateways including, but not limited to, status, unused bandwidth, and reliability. Possible implementations include, ranking network gateways with Active status higher than network gateways with Standby status, ranking network gateways such that the highest unused bandwidth correlates with the highest ranking, ranking network gateways such that the network gateway with the highest reliability indicator receives the highest ranking, and/or multi-factorial ranking that ranks network gateways based on an analysis of status, unused bandwidth, reliability indicator, and/or the like.

Block 610 represents routing the flow of data packets to the address of a high ranked network gateway. In some implementation this may be the highest ranked network gateway based on the ranking scheme applied to the hash table. In other implementations this may be a network gateway selected randomly or by other load balancing techniques from several high ranked network gateways. Routing flows to the high ranked network gateway leads to higher ranked network gateways receiving a greater number of flows. In implementations that determine the ranking based on the reliability indicator, the number of flows routed to the network gateway will decrease as the reliability of that network gateway decreases.

In some implementations the network gateways are represented in the hash table by MAC addresses. Thus, in routing to the network gateway the host is selecting one MAC address from the set of MAC addresses contained in the hash table. As the MAC address in the hash table change, both by addition and deletion of MAC addresses and reordering of the ranking, the flows may be sent to different network gateways. Therefore, as conditions change, the host may rotate through using various network gateways, with various MAC addresses, thus engaging in "MAC rotation."

Block 612 represents updating the hash table in response to the plurality of multicast messages. As the network gateways multicast updated health and performance information the hash table may reflect any changes and lead to a change in the ranking of the network gateways according to any of the ranking schemes in this disclosure.

Block 614 represents a decision point, a calculation of a reliability indicator for the network gateway. The calculation may be performed as part of the updating of the hash table as discussed in block 612. The calculation may also be performed responsive to each receipt of a multicast message. Following a given calculation of the reliability indicator for the network gateway, the reliability indicator may be raised, lowered, or remain the same.

If the calculation of the reliability indicator indicates that the reliability indicator dropped below the threshold level, the method may take the Below branch 616 to block 618 and remove the network gateway from the hash table. The threshold level may be set in advance or the threshold level may be a flexible threshold that depends, in some embodiments, on network conditions. By way of example and not limitation, if the reliability indicator represents reliability as "low," "medium," and "high" then the threshold level could be set such that all network gateways with a reliability of "low" are removed from the hash table. As an alternative, non-limiting example, if the reliability indicator represents reliability as a number such as 1-10, then the threshold level could be set such that all network gateways with a reliability of 7 or lower are removed from the hash table. Following removal of the network gateway the method 600 returns to box 608 for ranking of the network gateways remaining in the hash table.

Returning to the decision point at block 614, the calculation of the reliability indicator 614 indicates that the reliability indicator may rise above the threshold level. If the reliability indicator rises above, the method may take the Above branch 620 to block 622 and reintroduce the network gateway to the hash table. This threshold level may be the same or different than the threshold level discussed in connection with block 618. In implementations that involve dampening the rise in the reliability indicator as discussed in connection with box 606, the dampening may prevent reintroduction of the network gateway into the hash table because the network gateway has a history of poor reliability. This may lead to asymmetries between the removal and reintroduction of the network gateway to the hash table 400. By way of example and not limitation, the network gateway may be removed from the hash table if the reliability indicator drops below 7 but not reintroduced to the hash table 400 until the reliability indicator rises above 8. Following reintroduction of the network gateway the method returns to block 608 for ranking of the network gateways present in the hash table. In some implementations the network gateway may publish multicast messages indicating an Active status, but that network gateway may not be included in the hash table because of a history of poor reliability.

In other implementations the network gateway may be reintroduced to hash table following receipt of the single multicast message. This multicast message may contain a strong indicator of reliability that leads to immediate reintroduction to the hash table without consideration of the reliability indicator.

In some embodiments the network gateway may be reintroduced to the hash table in response to a query sent by the host or distributed directory server. If the network gateway responds to the query, or a plurality of queries, indicating Active status then the network gateway may be reintroduced to the hash table. Network gateways that are removed from the hash table may be stored in a separate memory so that the host or distributed directory server can maintain a record of formerly Active network gateways. In some embodiments removal from the hash table includes moving the record corresponding to the network gateway to a separate portion of the hash table, appending an indicator to the record corresponding to the network gateway, designating the network gateway as "removed," and the like.

Exemplary Network Gateway for Connecting a Domain to a Network

Figure 7:
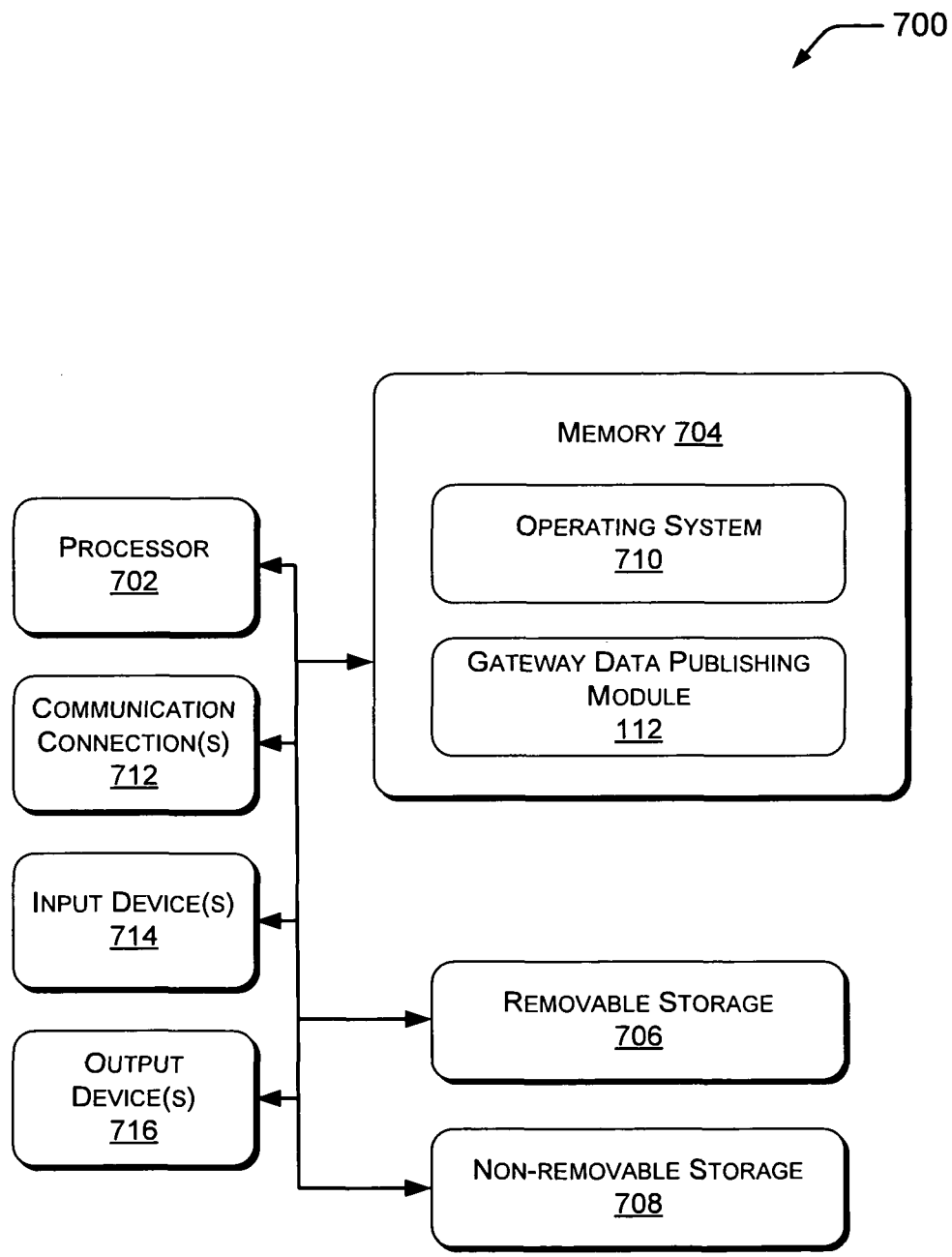
FIG. 7 is a schematic block diagram of an exemplary network gateway.

FIG. 7 illustrates an exemplary network gateway 700 to receive data packets from the host and provide those data packets to the network. The network gateway 700 may be configured as any suitable computing device or server capable of publishing advertisements. In one exemplary configuration, the network gateway 700 comprises at least one processor 702 and memory 704. The processor 702 may be implemented as appropriate in hardware, software, firmware, or combinations thereof. Software or firmware implementations of the processor 702 may include computer- or machine-executable instructions written in any suitable programming language to perform the various functions described.

Memory 704 may store programs of instructions that are loadable and executable on the processor 702, as well as data generated during the execution of these programs. Depending on the configuration and type of computing device, memory 704 may be volatile (such as RAM) and/or non-volatile (such as ROM, flash memory, etc.). The network gateway 700 may also include additional removable storage 706 and/or non-removable storage 708 including, but not limited to, magnetic storage, optical disks, and/or tape storage. The disk drives and their associated computer-readable media may provide non-volatile storage of computer readable instructions, data structures, program modules, and other data for the computing devices.

Memory 704, removable storage 706, and non-removable storage 708 are all examples of computer storage media. Computer storage media includes volatile and non-volatile, removable and non-removable media implemented in any method or technology for storage of information such as computer readable instructions, data structures, program modules, or other data. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can accessed by the server or other computing device.

Turning to the contents of the memory 704 in more detail, may include an operating system 710, one or more application programs or services. In one implementation, the memory 704 includes a gateway data publishing module 112 for publishing health and performance information related to the network gateway 700.

The network gateway 700 may also contain communications connection(s) 712 that allow the network gateway 700 to communicate with the host, a hub, a switch, a router, a network gateway in another domain, a stored database, another computing device or server, a user terminal, and/or other devices on the network. Communications connection(s) 712 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The network gateway 700 may also include input device(s) 714 such as a keyboard, mouse, pen, voice input device, touch input device, etc., and output device(s) 716, such as a display, speakers, printer, etc. The network gateway 700 may include a database hosted on the network gateway 700 including, but not limited to, session data, network addresses, list of hosts, and the like. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for distributing a health information and a performance information of network gateways, the method comprising:
   receiving a plurality of multicast messages from a plurality of network gateways in a domain, each of the plurality of multicast messages generated by at least one of the plurality of network gateways, the multicast messages comprising Media Access Control (MAC) address data, status data indicating an active status or a standby status, and bandwidth data, the plurality of multicast messages published on a predictable schedule;
   building a hash table of the MAC address data, the status data, and the bandwidth data;
   assigning a reliability indicator to each of the plurality of network gateways, the reliability indicator indicating a reliability based on a ratio of received multicast messages to expected multicast messages, the reliability indicator indicating a low reliability when at least one of the expected multicast messages is missing;
   ranking the plurality of network gateways maintained in the hash table;
   routing a flow of data packets to an address of a high ranked gateway maintained in the hash table, wherein the routing distributes a load across the plurality of network gateways by using a MAC rotation; and
   updating the hash table in response to the plurality of multicast messages.

2. The method of claim 1, wherein the bandwidth data comprises at least one of a percentage of an unused bandwidth or an absolute capacity of the unused bandwidth.

3. The method of claim 2, wherein the high ranked gateway comprises at least one of the plurality of network gateways with a largest percentage of the unused bandwidth or at least one of the plurality of network gateways with a largest absolute capacity of the unused bandwidth.

4. The method of claim 1, further comprising a data packet in the flow of data packets which includes a label identifying the data packet as belonging to the flow of data packets having a same source and a same destination.

5. The method of claim 1, further comprising removing a network gateway from the hash table when the reliability indicator drops below a threshold level.

6. The method of claim 1, further comprising reintroducing a gateway to the hash table when the reliability indicator rises above a threshold level.

7. The method of claim 6, further comprising dampening an increase in the reliability indicator based on a past value of the reliability indicator.

8. A computer-readable storage media excluding carrier waves comprising computer-executable instructions executable by a computing device, for performing acts comprising:

querying a hash table of gateway address data and gateway status data;

sending a data packet to a default address that directs the data packet to a predetermined gateway when there is no status data in the hash table indicating an active status of a gateway;

sending the data packet to an address corresponding to at least one of the gateway address data in the hash table when the hash table includes status data indicating the active status of the gateway;

modifying data in the hash table responsive to a multicast message received from the gateway, wherein the multicast message comprises health and performance information of the gateway and modifying the data in the hash table comprises changing a ranking of the gateway based at least in part on the health and performance information; and modifying a reliability indicator in the hash table based at least in part on a ratio of received multicast messages to expected multicast messages, wherein the plurality of multicast messages are published by the gateway on a predictable schedule.

9. The tangible computer-readable storage device of claim 8, wherein the gateway address data comprises at least one of a Media Access Control (MAC) address or an Internet Protocol (IP) address.

10. The tangible computer-readable storage device of claim 8, wherein the gateway status data comprises at least one of an active status additionally indicating a time period to change to the standby status or a standby status additionally indicating a time period to change to the active status.

11. The tangible computer-readable storage device of claim 8 further comprising ranking the gateway address data in the hash table such that a gateway having a large unused bandwidth has a high ranking.

12. The tangible computer-readable storage device of claim 8, wherein the sending the data packet to an address corresponding to at least one of the gateway address data sends the data packet to the gateway having a high ranking.

13. A system, comprising: one or more processors; and
one or more computer-readable device storing instructions that are executable by the one or more processors to perform acts comprising:
receiving a plurality of multicast messages from a plurality of network gateways in a domain, the plurality of multicast messages published on a predictable schedule, each of the plurality of multicast messages generated by at least one of the plurality of network gateways, the multicast messages comprising:
Media Access Control (MAC) address data, status data indicating an active status or a standby status, and bandwidth data;
building a hash table of the MAC address data, the status data, and the bandwidth data; assigning a reliability indicator to each of the plurality of network gateways based on a ratio of received multicast messages to expected multicast messages, the reliability indicator indicating a low reliability when at least one of the expected multicast messages is missing;
ranking the plurality of network gateways maintained in the hash table; routing a flow of data packets to an address of a high ranked gateway maintained in the hash table, the routing distributing a load across the plurality of network gateways by using a MAC rotation; and
updating the hash table in response to the plurality of multicast messages.

14. The system of claim 13, wherein the bandwidth data comprises at least one of a percentage of an unused bandwidth or an absolute capacity of the unused bandwidth.

15. The system of claim 13, wherein the high ranked gateway comprises at least one of the plurality of network gateways with a largest percentage of the unused bandwidth or at least one of the plurality of network gateways with a largest absolute capacity of the unused bandwidth.

16. The system of claim 13, further comprising a data packet in the flow of data packets which includes a label identifying the data packet as belonging to the flow of data packets having a same source and a same destination.

17. The system of claim 13, further comprising removing a network gateway from the hash table when the reliability indicator drops below a threshold level.

18. The system of claim 13, further comprising reintroducing a gateway to the hash table when the reliability indicator rises above a threshold level.

19. The system of claim 18, further comprising dampening an increase in the reliability indicator based on a past value of the reliability indicator.

* * * * *